Dec. 15, 1959   J. L. HALL ET AL   2,917,026
FAST ACTION HYDRAULIC VALVE
Filed April 1, 1955   2 Sheets-Sheet 1

INVENTOR
JOHN L. HALL & DOUGLAS A. ELLIOTT

Dec. 15, 1959  J. L. HALL ET AL  2,917,026
FAST ACTION HYDRAULIC VALVE
Filed April 1, 1955  2 Sheets-Sheet 2

INVENTORS
JOHN L. HALL & DOUGLAS A. ELLIOTT
BY
Godfrey B. Speir
ATTORNEY

United States Patent Office 2,917,026
Patented Dec. 15, 1959

2,917,026

FAST ACTION HYDRAULIC VALVE

John L. Hall, Hanover, and Douglas A. Elliott, Waldwick, N.J., assignors to Curtiss-Wright Corporation, a corporation of Delaware Application April 1, 1955, Serial No. 498,484

7 Claims. (Cl. 121—38)

This invention relates to a fluid-actuated fast-action mechanism, suitable for actuating valves, switches or the like.

The invention provides a three-position fast-action mechanism, useful in controlling valves, switches or other mechanisms and provides particularly for a very small dead zone. That is, an actuator for the mechanism requires small sensitive control movement to cause the mechanism to move quickly or snap to any one of its three positions, the movement of the output element of the action being powerful and substantial.

The invention comprises in certain aspects, a servo mechanism which is hydro-mechanical in operation and responsive to small, low-power movements of a control member.

In general, the invention comprises a sensitive pilot valve which, upon actuation, directs small amounts of pressurized fluid to a servo device. When fluid initiates servo device operation, the device reacts on the pilot valve to open it fully, admitting increased amounts of fluid to the servo device and causing it to move fully and quickly, with snap action effect, to the new position which the operation of the pilot valve has selected.

This invention has the advantage over prior art devices of requiring small control forces and movements to produce large output forces and movements, along with simplicity of mode of operation and components. A particular use for the device, which is exemplary only, is as a three-way valve actuator for a plurality of hydraulic coupling devices. Such an adaptation of the invention is disclosed in detail herein, as an example of the invention.

Figure 1:
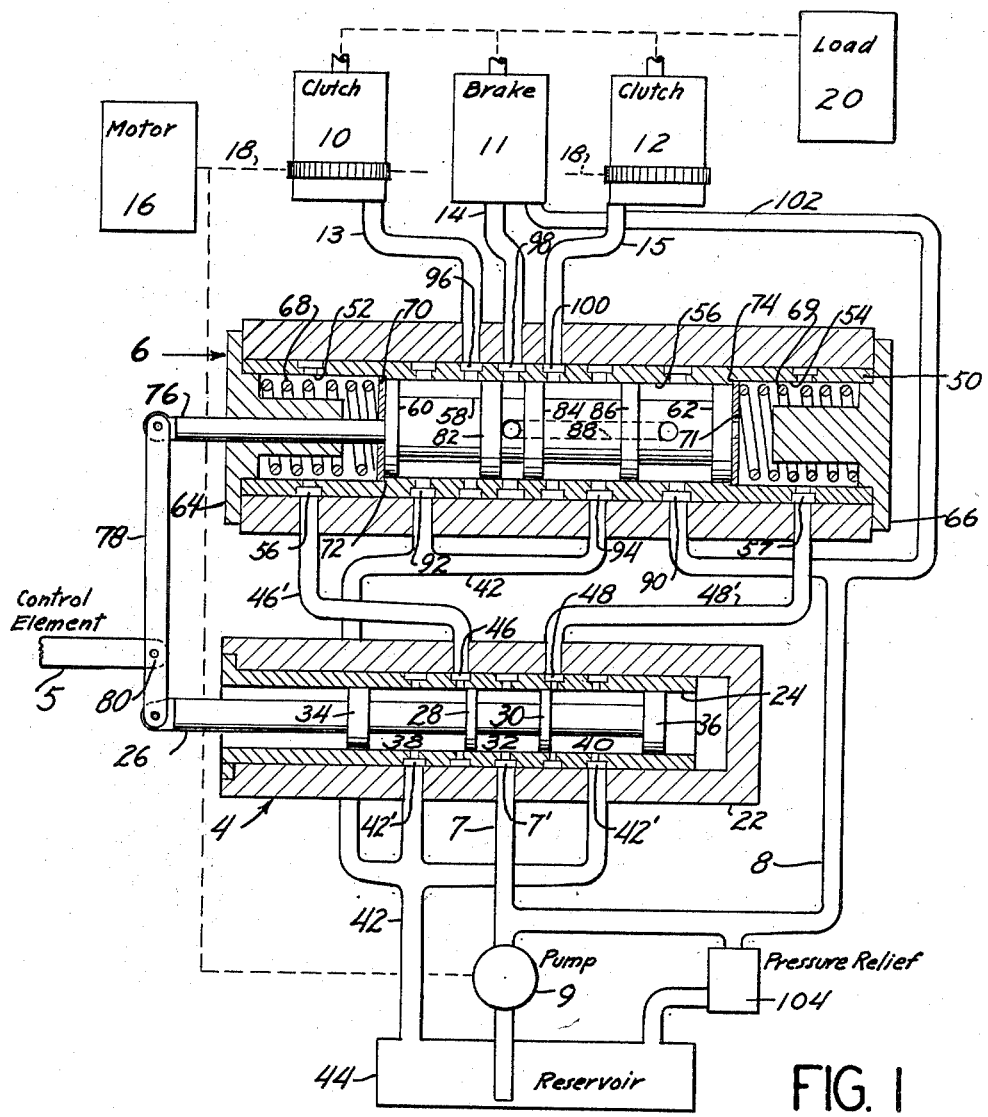
Figure 2:
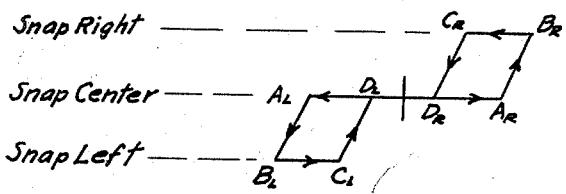
Figure 3:
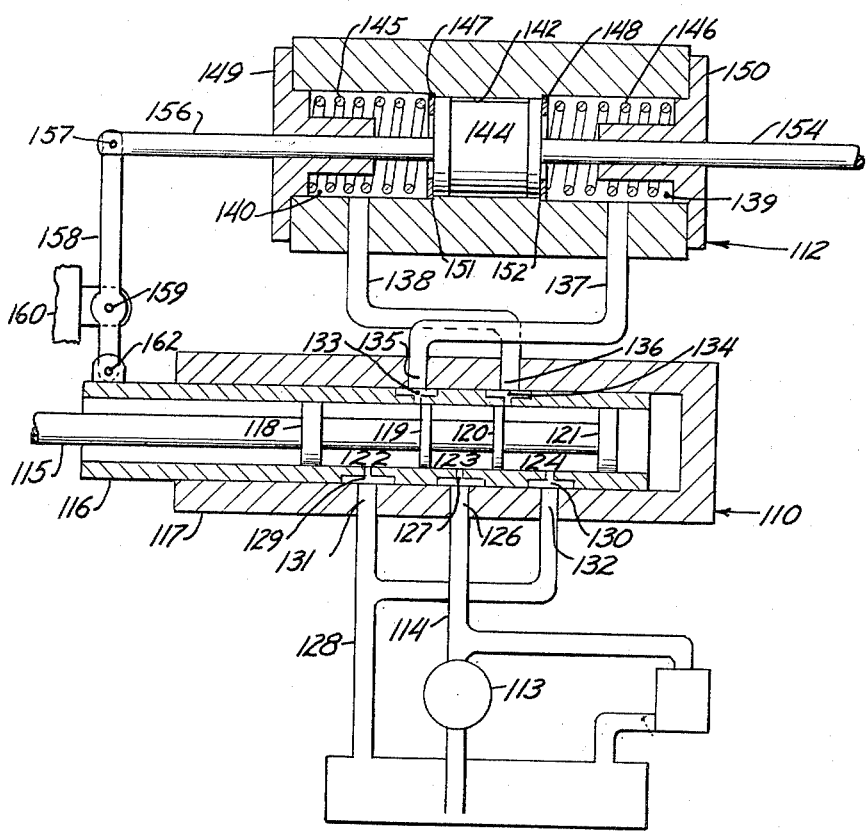

In the annexed drawings, a non-limiting embodiment of the invention is shown, similar reference characters refer to similar parts, and Fig. 1 shows longitudinal sections through principal components of the invention, together with schematic representations of environmental components, Fig. 2 is a diagram showing control characteristics and Fig. 3 is a longitudinal section of an alternative embodiment of the invention.

In Fig. 1 I show a pilot valve 4 actuated by a control rod or element 5, the latter being movable in small increments in a horizontal direction. The pilot valve controls a snap-action servo valve 6. Both valves 4 and 6 are provided with pressure fluid through conduits 7 and 8 respectively, from a pump 9. The fluid from conduit 8 is directed by valve 6 to hydraulic mechanisms 10, 11 or 12 for the actuation thereof, through conduits 13, 14 or 15 respectively.

In the schematic components shown, a motor or prime mover 16 drives mechanisms 10 and 12 through suitable gearing 18, and the mechanisms 10 and 12 comprise forward and reverse hydraulically actuated clutches. The output elements of the clutches are connected to a mechanism 20 to be controlled or actuated. Mechanism 11 comprises a hydraulically actuated brake to hold the mechanism 20 against movement when neither of the clutches 10 or 12 are engaged.

Such a combination of clutches and brake are useful in controlling the pitch of a variable pitch aeronautical propeller, or in controlling the area of a variable area discharge nozzle of a turbojet aircraft engine. Assemblies of this sort are shown in Chillson Patent #2,640,552 or in Hall, et al. application serial number 458,243 filed September 24, 1954, respectively. In such arrangements, it is desired that the brake be disengaged and the clutch engaged, or vice versa simultaneously and with minimum time lag and with minimum slip of either component, to avoid unnecessary slippage, power loss, heat loss and wear in the components.

In controlling the hydraulic (or pneumatic) clutches and brake, a desideratum is to dump the pressure and fluid from the unit to be disengaged with great promptness. With the same order of promptness, pressure fluid must be applied to the unit being engaged. This means that valves for pressurizing and draining the units must move between open and closed positions promptly, without any slow or alternated movement.

The pilot valve 4 comprises a barrel 22 having a bore 24 in which a stem 26 is slidable. The stem includes lands 28 and 30, spaced apart, fitted closely to the bore 24, and defining therebetween a cavity 32 which is always open to a port 7' connected to the pressure fluid conduit 7. Additional lands 34 and 36, spaced respectively from the lands 28 and 30, may be provided on the stem 26, defining cavities 38 and 40 respectively between the lands.

These connect at all times with drain ports 42' connected with a drain or low-pressure conduit 42, in turn connected to a reservoir 44 from which the pump 9 receives its fluid supply.

The bore 24 is provided with spaced ports 46 and 48, located in the cavities 38 and 40 respectively when the stem 26 is centered. When the stem is moved to the left, as shown, from the centered position, the land 28 first covers port 46 and upon further stem movement opens port 46 to the pressure fluid cavity 32. While this occurs, the port 48 still connects to the drain cavity 40. Similarly, when the stem is moved to the right as shown, land 30 covers port 48 and on continued stem movement opens port 48 to the pressure fluid cavity 32. At such time, port 46 remains connected to the drain cavity 38.

Ports 46 and 48 are connected to the snap-action servo valve 6 by conduits 46' and 48'. Valve 6 comprises a sleeve 50 having end bores 52 and 54 defining cylinders, and a central coaxial bore 56. Conduits 46' and 48' respectively communicate with bores 52 and 54 through ports 56 and 57. A stem 58 is axially slidable in the bore 56, having end lands 60 and 62 which form pistons for interaction with bores 52 and 54. The latter bores are closed at their outer ends by caps 64 and 66. Within the bore 52 is a preloaded compression spring 68, bearing at one end on the cap 64 and at its other end on a washer 70 which is stopped from rightward movement by a shoulder 72 defining the right end of bore 52 and the left end of the slightly smaller bore 56. The spring urges washer 70 toward or against the shoulder 72, and the washer in turn restrains the stem 58 against leftward movement therebeyond, unless a leftwardly directed force is exerted on stem 58 which is sufficient to overcome the force exerted by the spring 68.

In similar fashion, another spring 69 is disposed within the right-hand bore 54, acting between the cap 66 and another washer (or disc) 71. Leftward movement of this washer is limited by a shoulder 74 defining the left-hand end of the bore 54 and the right-hand end of the bore 56. The stem 58 is thus urged by the right-hand spring 69 to a position such that land 62 is located at the shoulder 74, unless the stem is moved by a force adequate to overcome the right-hand spring 69.

With equal or low fluid pressures in the bores 52 and 54, springs 68 and 69 center the stem 58. By the conduits 46' and 48', pressure fluid may be admitted to these bores to overcome the opposing spring, selectively, and to shuttle the stem 58 from the central position shown. The caps 64 and 66 include inner abutments as shown to limit the distance through which the stem 58 may move or shuttle. The stem 58 includes a coaxial rod 76 extending leftwardly therefrom, as shown, through the cap 64.

The exposed ends of the rod 76 and of the pilot valve stem 26 are connected by a link 78 which is pivotally secured at its ends to the rod and stem. The control rod 5 for the valve system is pivotally connected at 80 to the link 78, the pivot 80 lying, preferably, considerably closer to the stem 26 than to the rod 76.

From the structure which has been described, the fast or snap action operation of the stem 58 will now become evident. When rod 5 is moved a moderate amount to the left, the link 78 will be swung about its upper transiently fixed pivot and will traverse stem 26 to the left, moving land 28 across port 46 and admitting pressure fluid to conduit 46' and to the bore 52 in the valve unit 6. As pressure builds up in this bore, it will act against the left end of land 60, and will shift stem 58 rightwardly against right-hand spring 69. As this movement occurs, the link 78 will be swung clockwise about pivot 80, moving land 28 to open port 46 more than it was initially opened. Thereby, more pressure fluid is admitted to bore 52 to urge stem 58 farther to the right. This valve opening and stem shifting action is cumulative, and results in a fast or snap action in the shift of stem 58 from its central position to its right-hand limiting position.

If control movement of rod 5 is to the right, pressure fluid builds up in bore 54, and stem 58 is shifted to the left with fast or snap action, compressing the left-hand spring 68. During these sequences, the control rod 5 will not necessarily have shifted from that position which started the valve action. When restoration of the stem 58 to the central position is desired, from the first-described extreme rightward position, control rod 5 may be moved rightwardly until land 28 of the pilot valve reconnects the bore 52 to the drain line through the conduit 46' and the port 46. The right-hand spring 69 then overcomes fluid pressure in the bore 52, starting the stem 58 leftwardly. This swings the link 78 counter-clockwise around the pivot 80 and further moves land 28 to uncover port 46 to drain, cumulatively dumping pressure fluid from bore 52 to enable the stem 58 to return to its central position with fast or snap action.

If rightward movement of rod 5 were much more than enough to call for centralization of the pilot and snap action valves, snap action would start in the direction to cause leftward movement of stem 58. Restoration of stem 58 to central position from the leftward extreme position is accomplished similarly to that set forth above, by moving the rod 5 so that land 30 of pilot valve 4 opens bore 54 to drain through conduit 48' and port 48.

Dimensions of the pilot valve lands 28 and 30 and of ports 46 and 48 may be chosen to give a desired degree of sensitivity to the valve system, in conjunction with the proportions of the link 78 and its pivots and the throw or shuttling distance of the snap action stem 58.

Fig. 2 shows a control sensitivity diagram for the system, the length of the solid horizontal line AR—AL representing the dead zone through which the pilot stem 26 (and correspondingly, the control rod 5) is movable without starting snap action movement of the system. The point AR is that at which land 30 opens port 48 to pressure fluid, and the point AL is that at which the land 28 opens port 46 to pressure fluid, either of these openings initiating fast or snap action of the system as described.

As fast or snap action takes place in either direction, the pilot valve stem 26 is advanced by the link 78 to full opening of ports 46 or 48, without further movement of control rod 5. Thus, stem 26 reaches points BR or BL. Movement of stem 26 to restore the snap action to the central position is controlled by rod 5, and both of these elements must move toward the mid position until the lands 30 and 28 respectively restore ports 48 and 46 to initial communication with the drain lines. Thus, the stem 26 must be moved by rod 5 from points BR or BL to points CR or CL to initiate snap action of stem 58 under the influence of springs 68 or 69. When the return snap action starts, link 78 moves the stem 26 to positions DR or DL, whereupon the system comes to rest until further movements of the control rod 5 trigger the system again.

To avoid instability and possible cycling of the valve system, there should be a determinate positive distance or dead zone between points AL and DR, and between points DL and AR. By minimizing the distances BR—CR and BL—CL, which represent valve hysteresis, the normal full dead zone AL—AR may be reduced. Also, reduction of the horizontal distances AL—BL, CL—DL, AR—BR and CR—DR may be accomplished within practical limits to reduce hysteresis and dead zone by making the lands 28 and 30 thin and the ports 46 and 48 narrow in an axial direction. Practical limits for these dimensions, directed toward increasing sensitivity, would be dictated by potential leakage and by fluid flow requirements to attain adequate speed of action. The movement of the stem 26 over these latter distances is accomplished by the link 78. For an example of link dimensioning; If a typical horizontal distance AR—BR is .020" and the motion of the stem 58 between a center position and an end position is .100", the link ratio should be approximately 5:1 between stem 58 and pivot 80, and stem 26 and pivot 80.

Thus far the hydro-spring snap action only has been described. In Fig. 1 we also show a coordinated arrangement by which the snap stem 58 may be used as a hydraulic valve to control mechanisms 10, 11 and 12 previously mentioned.

The stem, slidable in the bore 56, carries lands 82 and 84 centrally thereof, and a land 86. The stem is drilled to provide a conduit 88 between the space between lands 86 and 62, and the space between lands 82 and 84. Pressure fluid is fed from conduit 8 to a sleeve port 90 disposed between lands 86 and 62, so that pressure fluid is available at all times between lands 82 and 84 through the conduit 88. The spaces between lands 60 and 82, and between 84 and 86 are at all times in communication with the drain conduit 42 through sleeve ports 92 and 94. The conduits 13, 14 and 15 respectively connect to ports 96, 98 and 100 disposed near the middle of sleeve 50.

When the stem 58 is in the center position shown, brake unit 11 is connected to the pressure fluid supply through conduits and ports 14, 98, 88, 90 and 8, while clutch 10 is connected to drain through conduits and ports 13, 96, 92, 42, and clutch 12 through conduits 15, 100, 94 and 42. Thereby the brake 11 is actuated and the clutches 10 and 12 are inactivated.

When the stem 58 is in a right-hand extreme position, pressure fluid is carried to clutch 12 through conduits and ports 8, 90, 88, 100 and 15, while couplings 10 and 11 are connected to drain through their respective ports 96 and 98, and through port 92 and conduit 42. When the stem 58 is in a left-hand extreme position, pressure fluid is carried to clutch 10 through conduits and ports 8, 90, 88, 96 and 13, while couplings 11 and 12 are connected to drain through their respective ports 98 and 100, and through port 94 and conduit 42.

A further pressure conduit 102 leads from conduit 8 to the brake 11. This serves to hold a brake-engaging spring out of action. Should fluid pressure in the entire system fail, the brake spring engages the brake to make the system fail-safe. This arrangement is shown in one of the patents mentioned previously, and does not comprise part of the present invention. The pressure fluid lines 7 and 8 are connected with a pressure limiting relief valve 104 in conventional manner.

Although the arrangement of Fig. 1 uses the snap-action stem 58 to actuate a hydraulic valve as described, it may also be used as a powerful actuator for other devices such as electrical switches. It could also be used as a direct mechanical actuator for suitably designed mechanisms, including direct mechanical clutches, brakes and the like.

In the arrangement above described, control force applied to the link 78 at pivot 80 should be sufficient to resist dislocation of pivot 80 when the stem 58 snaps, so that stem 26 will be moved quickly to open the pilot valve ports. In many environments this arrangement is satisfactory.

In situations where control forces are small or weak, and when it is desired to eliminate feedback into the control system, the arrangement may be modified with only slight additional complication. Such an arrangement is shown in Fig. 3, which will now be described.

Fig. 3 presents an alternative arrangement of the snap-action mechanism wherein a pilot valve is shown at 110, connected to a snap-action, three-position device 112. The pilot valve is supplied with pressurized fluid from a pump 113 through a conduit 114, the pump being supplied from a reservoir as described previously. The pilot valve comprises a stem 115 actuated by any suitable control, the stem moving axially in a sleeve 116 which in turn is axially slidable in the housing 117 of the pilot valve. The stem 115 is provided with lands 118, 119, 120 and 121 which define spaces 122, 123 and 124 therebetween. Space 123 is at all times provided with pressure fluid from conduit 114 through a port 126 in the housing 117, and a port 127 in the sleeve 116, this port including an elongated transfer space as shown so that pressure fluid passes to the cavity 123 in all operating axial positions of the sleeve in the housing. The cavities 122 and 124 are open to a drain conduit 128 through sleeve ports 129 and 130 respectively, these also having elongated transfer spaces, and through housing ports 131 and 132 respectively.

The sleeve has ports 133 and 134 with elongated transfer spaces respectively to the left and right of lands 119 and 120 when the sleeve and stem 115 are in the central position as shown. These ports register with housing ports 135 and 136 respectively, communicating with conduits 137 and 138 opening to cavities 139 and 140 at opposite ends of the snap action device 112. This device comprises a central cylinder 142 containing a slidable piston 144, the piston being slidable either rightwardly or leftwardly, as shown, into the cavities 139 or 140 respectively. However, the piston is resiliently urged to the central position by springs 145 and 146 within respective cavities 140 and 139, the springs respectively engaging washers 147 and 148 at their inner ends, and cavity end closures 149 and 150 at their outer ends. The washers 147 and 148 are stopped at the ends of the cylinder 142 by shoulders 151 and 152 formed at the junction of cavity 140 and cylinder 142, and of cylinder 142 and cavity 139, respectively.

The piston 144 carries an output rod 154 extending from one end of the device 112 through the closure 150. Another rod 156 extends from the other end of the piston through the closure 149 and includes an end pivot 157. To this pivot a rocker 158 is connected, the rocker being pivoted at 159 intermediate its length to a fixed element 160. The lower end of the rocker 158, as shown, is pivotally connected at 162 to the sleeve 116.

The operation of the Fig. 3 arrangement is as follows:

When the control stem 115 is moved to the left a sufficient amount, cavity 123 is opened to port 133, and pressure fluid is admitted to cavity 139 in device 112. As piston 144 starts to move leftwardly, the rocker 158 shifts sleeve 116 to the right, further opening the port 133 to pressure fluid, admitting more thereof to cavity 139 and thereby moving piston 144 leftwardly against spring 145 with a fast snap action. This occurs even though movement of the control stem 115 might only be enough to barely open the port 133 to pressure fluid.

The rod 154 moves with piston 144, and its snap movement may be used to actuate any suitable device. It will be noted that the snap action is afforded with no force reaction at all on the control stem 115. The only control force required for the stem 115 is that needed to overcome the small friction between the stem lands and the sleeve 116.

To return the snap-action device 112 to the central position, stem 115 is moved to the right until land 119 uncovers port 133 to drain. This starts to drain cavity 139, and as the piston 144 starts to move to the right under the influence of spring 145, the rocker arm 158 shifts sleeve 116 to open port 133 wide, to drain, allowing the piston to center with snap action as urged by the spring.

Rightward snap action of the piston 144, and its return to the center position, is accomplished in similar fashion, except that the stem 115 is moved rightwardly to enable land 120 to open port 134 to the pressure fluid cavity 123, and then leftwardly to open port 134 to the drain cavity 124.

While we have shown and described two embodiments of the invention, it is to be understood that the invention may be applied in other and various forms. Changes may be made without departing from the spirit of the invention. For definitions of the limits of the invention, reference should be had to the following claims.

We claim:

1. A hydraulic fast-action mechanism comprising structure having a pilot valve bore and a fast-action bore, a pilot stem movable in said pilot bore, a fast-action stem movable in said fast-action bore, a control member connected to said pilot stem, centering springs in said fast-action bore engageable with said fast-action stem and normally holding said fast-action stem centrally along said bore, a pressure fluid supply for said mechanism, means under the control of said pilot stem to direct fluid from said pilot bore to one or the other end of said fast-action bore, means also under the control of said pilot stem to open the other or the one end of said fast-action bore to drain, and means interconnecting said pilot stem and fast-action stem operable to further move said pilot stem in a direction to pass more fluid to said fast-action bore upon initiation of movement of said fast-action stem.

2. A hydraulic fast-action mechanism comprising a fast-action stem, opposed closed-end cylinders embracing said stem, each having a port for the admission of pressure fluid thereto, said stem having thereon a piston slidable in each cylinder, limited-length resilient means in each cylinder, acting in opposition, normally urging said pistons to a central position between said cylinders, a source of pressure fluid, a pilot valve fed from said source and having fluid connections to the ports of said cylinders, said pilot valve including a stem movable in opposite directions to direct pressure fluid to one or the other of said cylinders, and a link connecting said fast-action stem and a portion of said pilot valve, said link acting to further open said pilot valve upon initiation of opening of said pilot valve.

3. In a fast-action mechanism, a source of pressurized fluid, a hydraulic actuator including a movable member moved in one direction by the admission of pressure fluid thereto, resilient means urging said movable member in the opposite direction, a pilot valve including a movable control stem and a movable sleeve, means to supply pressurized fluid to said pilot valve, and a conduit from said pilot valve to said actuator, said pilot valve stem and sleeve including ports registrable to pass fluid from said supply means to said conduit for actuating the movable member, and a connection from said movable member to said sleeve operable upon actuation of the movable member to increase the flow of fluid from said supply means to said conduit.

4. A hydraulic fast-action mechanism comprising opposed hydraulic motors and a driven member operated thereby in a direction dependent on which of said motors is energized, resilient means to center said driven member when neither of said motors is energized, a pressure fluid supply, a pilot valve including a port connected to said supply, a port connected to each of said motors, and a drain port, a movable stem in said valve operable to open said supply, selectively, to either one of said motor ports and to open the other motor port to the drain port, or to open both motor ports to said drain port, and a mechanical reverse feedback connection from said driven member to said pilot valve operable to increase the effective openings of said ports upon initiation of driven member movement in the direction selected and initiated by operation of said pilot valve.

5. A mechanism according to claim 4 wherein said pilot valve includes a stem, wherein said feedback connection is jointed to said stem, and a control element jointed to said feedback connection.

6. A mechanism according to claim 4 wherein said pilot valve includes a control stem movable to select desired mechanism action, and an element movable relative to said stem and jointed to said feedback connection.

7. A hydraulic fast acting mechanism comprising a hydraulic motor including a stationary member and a movable driven member, a valve connected with said motor selectively openable in different directions to pass pressure fluid to or to drain fluid from said motor, means connecting said driven member with said valve operable to increase the opening thereof after initial opening and driven member movement to accelerate the passage of fluid to said motor or from said motor respectively, the valve including a stem movable to control fluid flow therethrough, and a movable sleeve embracing said stem, the sleeve being connected to and operated by said connecting means.

References Cited in the file of this patent
UNITED STATES PATENTS

| | | |
|---|---|---|
| 695,401 | Koons | Mar. 11, 1902 |
| 731,929 | May | June 23, 1903 |
| 1,231,257 | Herr | June 26, 1917 |
| 1,543,218 | Martin | June 23, 1925 |
| 1,617,516 | Farquhar | Feb. 15, 1927 |
| 1,638,102 | Roucka | Aug. 9, 1927 |
| 1,711,967 | Robson | May 7, 1929 |
| 1,785,759 | Baumgartner | Dec. 23, 1930 |
| 1,839,833 | Coates | Jan. 5, 1932 |
| 1,877,102 | Whitesell | Sept. 13, 1932 |
| 1,972,474 | Davis | Sept. 4, 1934 |
| 2,140,095 | Theed | Dec. 13, 1938 |
| 2,308,214 | Stegelitz et al. | Jan. 12, 1943 |
| 2,311,576 | Rockwell | Feb. 16, 1943 |
| 2,363,179 | Harrington | Nov. 21, 1944 |

FOREIGN PATENTS

| | | |
|---|---|---|
| 327,386 | Germany | Oct. 11, 1920 |